United States Patent
Linsky et al.

(10) Patent No.: US 7,839,833 B2
(45) Date of Patent: Nov. 23, 2010

(54) METHOD AND APPARATUS FOR REDUCED COMPLEXITY SHORT RANGE WIRELESS COMMUNICATION

(75) Inventors: Joel Linsky, San Diego, CA (US); Terrance R Bourk, Clinton, WA (US)

(73) Assignee: Qualcomm Incorporated, San Diego, CA (US)

( * ) Notice: Subject to any disclaimer, the term of this patent is extended or adjusted under 35 U.S.C. 154(b) by 305 days.

(21) Appl. No.: 11/971,116

(22) Filed: Jan. 8, 2008

(65) Prior Publication Data

US 2008/0102861 A1 May 1, 2008

Related U.S. Application Data

(62) Division of application No. 11/039,207, filed on Jan. 19, 2005.

(51) Int. Cl.
*H04Q 7/24* (2006.01)
(52) U.S. Cl. ............... 370/338; 370/344; 455/41.2
(58) Field of Classification Search ......... 370/328–338, 370/344–348, 350; 455/41.2, 458
See application file for complete search history.

(56) References Cited

U.S. PATENT DOCUMENTS

| | | | |
|---|---|---|---|
| 6,697,638 B1 | 2/2004 | Larsson et al. | |
| 6,711,151 B1 | 3/2004 | Ziegler | |
| 6,795,421 B1 | 9/2004 | Heinonen et al. | |
| 6,856,789 B2 | 2/2005 | Pattabiraman et al. | |
| 6,901,057 B2 * | 5/2005 | Rune et al. | 370/310 |
| 7,079,811 B2 | 7/2006 | Lee et al. | |
| 7,194,238 B2 | 3/2007 | Virtanen | |
| 7,212,833 B2 | 5/2007 | Sugaya | |
| 7,313,120 B2 | 12/2007 | Ekberg et al. | |
| 7,336,645 B2 | 2/2008 | Hur et al. | |
| 2001/0029166 A1 * | 10/2001 | Rune et al. | 455/41 |
| 2003/0021262 A1 | 1/2003 | Ma et al. | |
| 2003/0060222 A1 * | 3/2003 | Rune | 455/517 |
| 2003/0228844 A1 | 12/2003 | Jeannerod | |
| 2004/0082343 A1 | 4/2004 | Kim et al. | |
| 2004/0114538 A1 * | 6/2004 | Bouet | 370/254 |
| 2004/0136350 A1 | 7/2004 | Warmers | |
| 2004/0142691 A1 | 7/2004 | Jollota et al. | |
| 2005/0058109 A1 | 3/2005 | Ekberg | |
| 2005/0088997 A1 * | 4/2005 | Melpignano | 370/338 |
| 2005/0164635 A1 | 7/2005 | Yang et al. | |
| 2005/0181725 A1 * | 8/2005 | Dabak et al. | 455/41.2 |
| 2006/0128308 A1 | 6/2006 | Michael et al. | |
| 2007/0047506 A1 | 3/2007 | Froehling et al. | |

\* cited by examiner

*Primary Examiner*—Nhan Le
(74) *Attorney, Agent, or Firm*—Abdollah Katbab (57) ABSTRACT

A reduced complexity short range wireless communication system and method are described providing a very low complexity, low cost, and low power version of Bluetooth Wireless Technology. In one embodiment, the low complexity version relies upon mechanisms and procedures already present in existing standards, such as Version 1.2 of the Bluetooth Specification. In this embodiment, the inventive method and apparatus take advantage of essential mechanisms and procedures already present in the Bluetooth Specification, while eliminating the need for the parts of the Bluetooth Specification that are not required by very low complexity devices.

18 Claims, 9 Drawing Sheets

| STEP | MESSAGE | PACKET TYPE | DIRECTION | HOPPING SEQUENCE | ACCESS CODE AND CLOCK |
|---|---|---|---|---|---|
| 1 | PAGE | ID | MASTER TO SLAVE | PAGE | SLAVE |
| 2 | FIRST SLAVE PAGE RESPONSE | ID | SLAVE TO MASTER | PAGE RESPONSE | SLAVE |
| 3 | MASTER PAGE RESPONSE | FHS | MASTER TO SLAVE | PAGE | SLAVE |
| 4 | SECOND SLAVE PAGE RESPONSE | ID | SLAVE TO MASTER | PAGE RESPONSE | SLAVE |
| 5 | 1ST PACKET MASTER | POLL | MASTER TO SLAVE | CHANNEL | MASTER |
| 6 | 1ST PACKET SLAVE | ANY TYPE | SLAVE TO MASTER | CHANNEL | MASTER |

*FIG. 4*

| STEP | MESSAGE | PACKET TYPE | DIRECTION | HOPPING SEQUENCE | ACCESS CODE AND CLOCK |
|---|---|---|---|---|---|
| 1 | PAGE | ID | MASTER TO SLAVE OR REMOTE TO CENTRAL | PAGE | SLAVE |
| 2 | FIRST SLAVE PAGE RESPONSE | ID | SLAVE TO MASTER OR CENTRAL TO REMOTE | PAGE RESPONSE | SLAVE |
| 3 | MASTER PAGE RESPONSE | ANY TYPE | MASTER TO SLAVE OR REMOTE TO CENTRAL | PAGE | SLAVE |
| 4 | SECOND SLAVE PAGE RESPONSE | ANY TYPE | SLAVE TO MASTER OR CENTRAL TO REMOTE | PAGE RESPONSE | SLAVE |
| 5 | 1ST PACKET MASTER | POLL | MASTER TO SLAVE | CHANNEL | MASTER |
| 6 | 1ST PACKET SLAVE | ANY TYPE | SLAVE TO MASTER | CHANNEL | MASTER |

METHOD AND APPARATUS FOR REDUCED COMPLEXITY SHORT RANGE WIRELESS COMMUNICATION

RELATED APPLICATIONS

This application is a divisional of application Ser. No. 11/039,207 filed Jan. 18, 2005 entitled "Method And Apparatus For Reduced Complexity Short Range Wireless Communication", which application claims priority from provisional U.S. Patent Application Ser. No. 60/538,089, entitled "Method and Apparatus for a Reduced Complexity Short Range Wireless Communication System," filed on Jan. 20, 2004, which is hereby incorporated herein by reference in its entirety.

This invention is related to commonly-assigned co-pending U.S. patent application Ser. No. 10/216,082, filed Aug. 8, 2002, entitled "Method and Apparatus for a Dual-Mode Radio in a Wireless Communication System"; and commonly-assigned co-pending U.S. patent application Ser. No. 10/235,090, filed Sep. 3, 2002, entitled "Method and Apparatus Implementing an Overlay Adaptive Frequency Hopping Kernel in a Wireless Communication System," both of which are hereby incorporated herein by reference in their entireties and referred to hereafter as "the related applications."

FIELD OF THE INVENTION

This invention relates to the field of wireless communication systems and more particularly to the field of short range wireless communication systems.

BACKGROUND OF THE INVENTION

Wireless communication systems facilitate high-speed connectivity and data and voice transport from point-to-point and point-to-multipoint bases. Exemplary wireless communication systems include "Bluetooth™ protocol" enabled systems that facilitate the transport of data between Bluetooth enabled devices such as wireless headsets, cellular phones, laptop computers and personal digital assistants (PDAs), and "IEEE 802 protocol" systems that facilitate the transport of data over wireless local area networks (WLANs), which include devices such as desktop and laptop computers.

As is well known, Bluetooth is a global specification standard for radio communications operating in the unlicensed Industrial, Scientific, and Medical (ISM) band at 2.4 GHz. Bluetooth enabled devices, which are devices that comply with the Bluetooth Specification, replace normal cable connections with short-range radio links. Bluetooth offers a robust, low-complexity, low cost and low power cable-less connection solution. Bluetooth technology is featured in cordless telephony, intercom, facsimile (FAX) and Local Area Network (LAN) access, and dial-up networking applications. Bluetooth wireless communication protocols are implemented in wireless headsets, cellular phones, PDAs, printers, and other mobile devices. Bluetooth technology is described in more detail in a specification published by the Bluetooth Special Interest Group (SIG), entitled "Specification of the Bluetooth System, Version 1.2", electronically available to the public via the well-known Internet at <http://www.Bluetooth.org>, published on Nov. 5, 2003, referred to herein as the "Bluetooth Specification," and is hereby incorporated herein by reference in its entirety for its teachings on Bluetooth flow control, signals, devices and communication protocols and schemes.

In some applications, there is a need to send data intermittently and to do so with very low power consumption and at very low cost. Some examples of these applications are window sensors for security systems, light switches, TV/stereo remote control units, some location services, temperature sensors, and tire pressure gauges. In many cases, these same applications are being considered for use in the well-known "Zigbee" communication system.

Zigbee provides a relatively low power, low cost cable-less connection solution. In addition, many devices can be simultaneously inter-connected using the Zigbee approach. It has been argued by those supporting the Zigbee approach that Bluetooth wireless technology costs too much money, uses too much power, and cannot support more than seven devices without using a "park" state.

One concern associated with cost and power consumption in Bluetooth devices is necessitated by the software and its associated Random Access Memory (RAM) and Read Only Memory (ROM) (or Flash) requirements. The Bluetooth baseband is relatively simple. However, the software/firmware layers, and the variety of options and protocols lead to a significant percentage of chip die area. In a Host Controller Interface (HCI) solution, including the Radio Frequency (RF), Baseband, Link Manager Protocol, and Host Controller Interface layers (Parts A, B, C and E of Volume 2 of the Bluetooth Specification), the vast majority of code space is dedicated to the Link Manager Protocol (LMP) and HCI, and even the simplest task of establishing an Asynchronous Connectionless (ACL) data connection requires significant code.

One approach to providing a reduced complexity/cost/power short range wireless solution is to eliminate die area, and therefore cost as well as leakage current, by eliminating not only HCI, but also LMP and most of the baseband functions as well. A device that only supports the most basic baseband operations will be significantly more efficient than one that is able to establish basic ACL connections.

In June 2003, Ericsson announced a simplified version of Bluetooth Wireless Technology referred to by the press as "Bluetooth Lite." At the time of Ericsson's announcement, a simplified version of Bluetooth, according to Ericsson, was "in an investigative stage" and no details of the Media Access Controller (MAC) were provided. The article and a presentation given at the Bluetooth World Congress in June 2003 proposed that the Bluetooth Physical Layer (PHY) would be used in "Bluetooth Lite" and that the existing Bluetooth MAC would be substantially reduced. A need therefore exists for a reduced-complexity MAC that could be adapted for use with the "Bluetooth Lite" concept suggested by Ericsson. It is also advantageous to provide a reduced-complexity solution that can be adapted for use as an independent feature in a future release of the incorporated Bluetooth Specification.

Therefore, a need exists for a method and apparatus that offers a very low complexity, low cost, and low power version of Bluetooth Wireless Technology that can accommodate devices targeted towards this market segment.

SUMMARY OF THE INVENTION

A reduced complexity short range wireless communication system and method are described providing a very low complexity, low cost, and low power version of Bluetooth Wireless Technology. In one embodiment, the low complexity version relies upon mechanisms and procedures already present in existing standards, such as Version 1.2 of the Bluetooth Specification. In this embodiment, the inventive method and apparatus take advantage of essential mechanisms and procedures already present in the Bluetooth Specification, while eliminating the need for the parts of the Bluetooth Specification that are not required by very low complexity devices.

More specifically, the present invention provides a generic paging scheme that allows a remote device and a central device to exchange information during a paging session. In general, the remote device initiates the paging session by sending a paging message in the form of a Bluetooth Identity (ID) packet to the central device. In response, the central device sends a first slave response in the form of an ID packet to the remote device. Then, rather than sending a Bluetooth Frequency Hop Synchronization (FHS) packet to the central device according to the typical Bluetooth paging session, the remote device sends a master page response in the form of a non-FHS packet having a payload including tagged data either providing information to the central device or requesting information from the central device. The central device responds in a second slave response by sending a non-ID packet having a payload including tagged data either acknowledging receipt of information from the remote device or providing information to the remote device in response to a request for information in the master page response.

In another embodiment, the present invention provides a scheme that allows a remote device and a central device to exchange information immediately after establishing a connection using a typical Bluetooth paging session. In general, the remote device initiates a typical Bluetooth paging session in order to establish a connection with the central device. Thereafter, the remote device sends a first Bluetooth Auxiliary (AUX1) packet having a payload including tagged data either providing information to the central device or requesting information from the central device. The central device responds by sending a second AUX1 packet having a payload including tagged data either acknowledging receipt of information from the remote device or providing information to the remote device in response to a request for information in the master page response.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The method and apparatus of the present invention is referred to throughout the application as a reduced-complexity Bluetooth MAC. The requirements of the present reduced complexity Bluetooth protocol are: very low cost, very low power consumption, worldwide spectrum availability, and sufficient performance for the target applications. Target applications include, but are not limited to, devices that need only to infrequently transmit very limited amounts of information. This information may be periodic or irregular. Examples of this type of device are light switches, window sensors for an alarm system, and remote control devices for televisions or stereos. In each example, the latency for transmitting the information is probably in the sub-one second timescale and the power consumption must be minimized. It is also desirable to minimize the cost of these devices.

In accordance with the present invention, there are three types of reduced complexity Bluetooth devices: "remote" devices, "central" devices, and "central-remote" devices. Remote devices are very limited in what they can do and are designed to have minimal power consumption. A remote device can transmit information and request information. The remote device may only be awake when it is transmitting data or initiating a request for data.

A central device listens for remote devices and may be active much of the time. As the duty cycle of the central device increases, the power consumption and access latency of remote devices decreases. Therefore, central devices may, in most typical applications, be powered by an AC outlet rather than by batteries. Central devices may have very limited functionality or they may be standard Bluetooth devices, which also support the reduced complexity Bluetooth feature.

A central-remote device supports the functionality of both a central device and a remote device, and can be used as a bridging device between different piconets. A piconet is a group of Bluetooth devices including one master device and one or more slave devices. Since a central-remote device supports the central device functionality, it may also be a standard Bluetooth device supporting the reduced complexity Bluetooth feature.

In accordance with the present invention, reduced complexity Bluetooth devices may be configured in a variety of network topologies.

Figure 1A:
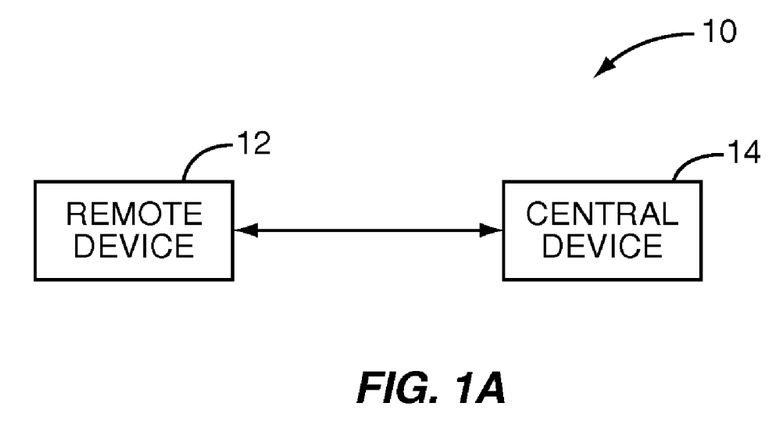
FIGS. 1A-1D illustrate multiple short range communication topologies for communicating between one or more remote devices and a central device according to the reduced complexity Bluetooth protocol of the present invention.

As illustrated in FIG. 1A, a first reduced complexity Bluetooth network topology is a point-to-point topology 10. In this topology, there is one remote device 12 and one central device 14. As shown in the diagram above, the remote device 12 can transmit data to the central device 14, or request data from the central device 14.

Figure 1B:
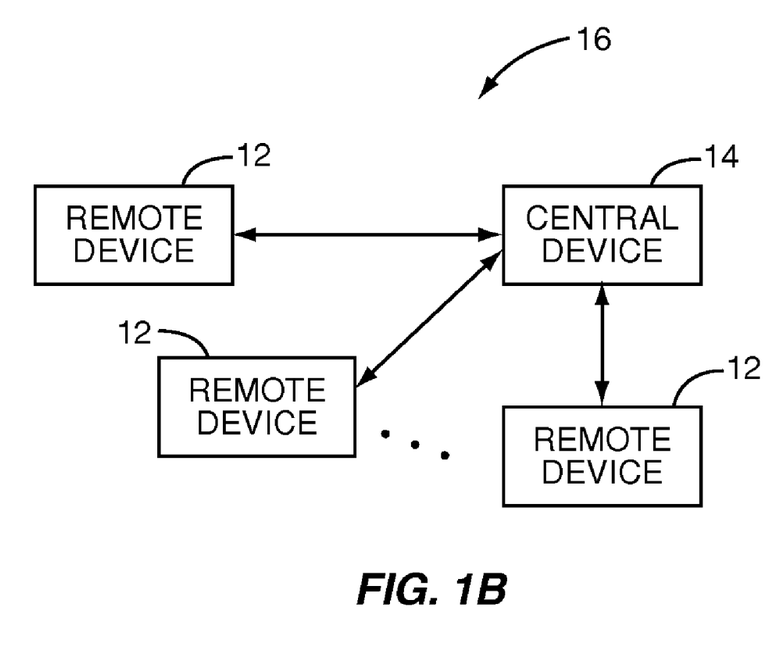

As illustrated in FIG. 1B, a second reduced complexity Bluetooth network topology is a multi-point-to-point topology 16. This topology includes multiple remote devices 12 and the central device 14. As illustrated, the remote devices 12 can transmit data to the central device 14 or request data from the central device 14.

Figure 1C:
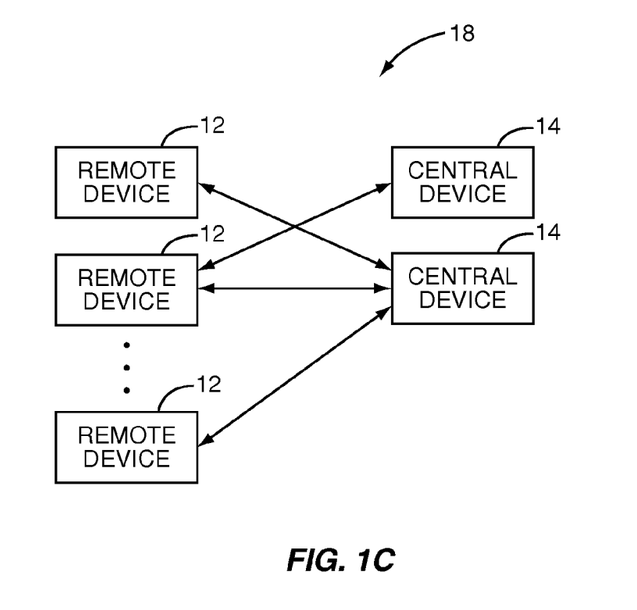

FIG. 1C illustrates a third reduced complexity Bluetooth network topology, which is a multi-point-to-multi-point topology 18. This network topology is similar to the multi-point-to-point topology 16 described above. However, one or more of the remote devices 12 can transmit data or request data from multiple central devices 14.

Figure 1D:
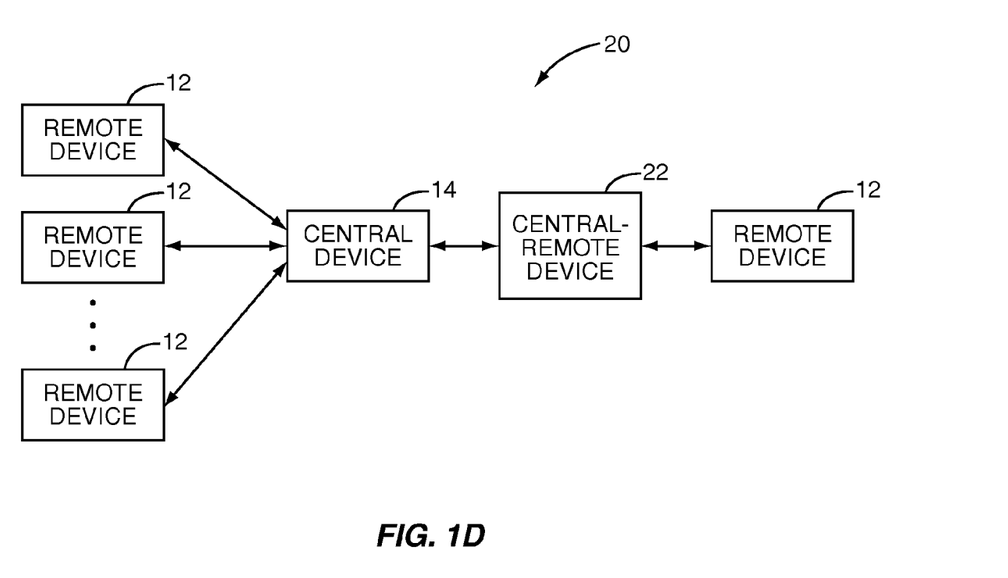

FIG. 1D illustrates a fourth reduced complexity Bluetooth network topology, which is a multi-network topology 20. As illustrated, the multi-network topology 20 includes a central-remote device 22 operating in multiple networks simultaneously and may act as a bridge between two (multi)point-to-point networks. In other words, the central-remote device 22 operates as a bridge between one of the remote devices 12 and the central device 14.

In one embodiment of the present invention, the reduced complexity Bluetooth network topologies of FIGS. 1A-1D use an unslotted Aloha network access scheme without random backoff. In this scheme, the remote devices 12 can initiate sending or requesting data at any time. It is only possible to transfer data from the central device 14 to one of the remote devices 12 when the remote device 12 requests this information. This concept is similar to the polling concept in the incorporated Bluetooth specification in that a slave can only transmit data to the master when it is polled. The difference in the reduced complexity Bluetooth network topologies is that multiple remote devices 12 can "poll" one central device 14 rather than one device polling many.

Each of the remote devices 12 includes a controller including a reduced complexity Bluetooth Medium Access Control (MAC) layer that uses the standard Bluetooth packet format, which includes an access code, packet header, and a payload, for communication between the remote devices 12 and the central device 14. The central device 14 and the central-remote device 22 also have controllers including a MAC layer. The MAC layer of the central device 14 and the central-remote device 22 may include the typical Bluetooth MAC layer, which includes the L2CAP layer, the LM layer, and the baseband layer, that has been modified according to the reduced complexity Bluetooth protocol of the present invention.

In one implementation, the payload of reduced complexity Bluetooth packets uses a tagged data format. Each tag has an ID, a length field, and optionally, an information field. Multiple tags can be in a single reduced complexity Bluetooth payload. The available tags in one implementation are shown in Table 1 below:

TABLE 1 reduced complexity Bluetooth Payload - Available Tags

| Tag | Short Name | Description |
| --- | --- | --- |
| From | FROM | Indicates the address of the sending device. |
| Origin | ORIG | Indicates the origin of the message. This is only used in a multi-hop information exchange. |

TABLE 1-continued reduced complexity Bluetooth Payload - Available Tags

| Tag | Short Name | Description |
| --- | --- | --- |
| Destination | DEST | Indicates the destination of the message. This is only used in a multi-hop information exchange. |
| Information | INFO | Information sent by the device. This tag may be sent by the remote or central device. |
| Information Request | INFO_REQ | Requests information from the central device. |
| Acknowledgement | ACK | Sent by a central device to acknowledge the reception of information. |
| Information Reject | REJ | Used by the central device to reject the request for information from the remote device. This tag would include the reason for the rejection. |
| Pending | PEND | Sent by a central device if the requested information isn't immediately available. The remote device will repeat the information request at a later time. |

In one embodiment, there are four message exchange types defined in the reduced complexity Bluetooth MAC. As described below in more detail, these message exchange types are: sending information; requesting information; sending and requesting information; and requesting information with delayed response. In one embodiment, all message exchanges are performed in two steps and are initiated by the remote device 12.

Figure 2A:
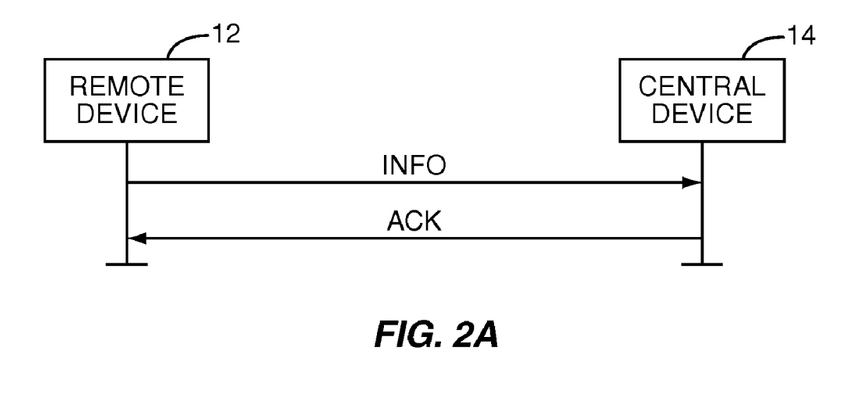
FIGS. 2A-2E illustrate various embodiments of a tagged data message exchange for exchanging information between a remote device and a central device according to the present invention.

As shown in FIG. 2A, the remote device 12 can send information to the central device 14 by sending a packet with an INFO tag in the payload. The central device 14 acknowledges the information by sending back a packet with an ACK tag in the payload.

Figure 2B:
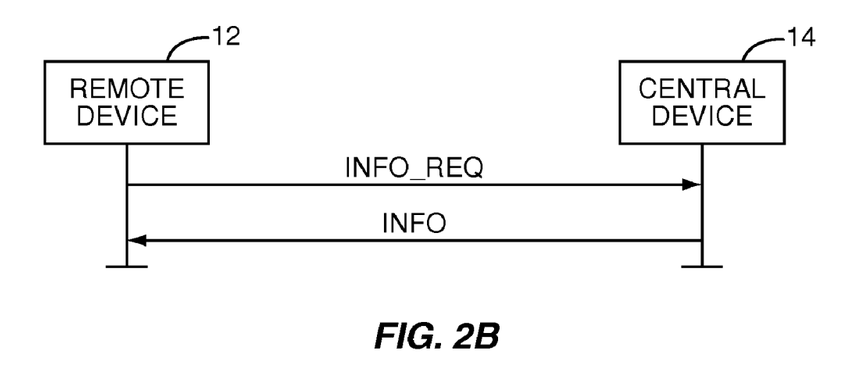

As shown in FIG. 2B, the remote device 12 can request information from the central device 14 by sending an INFO_REQ tag. The central device 14 replies back with an INFO tag containing the requested information.

Figure 2C:
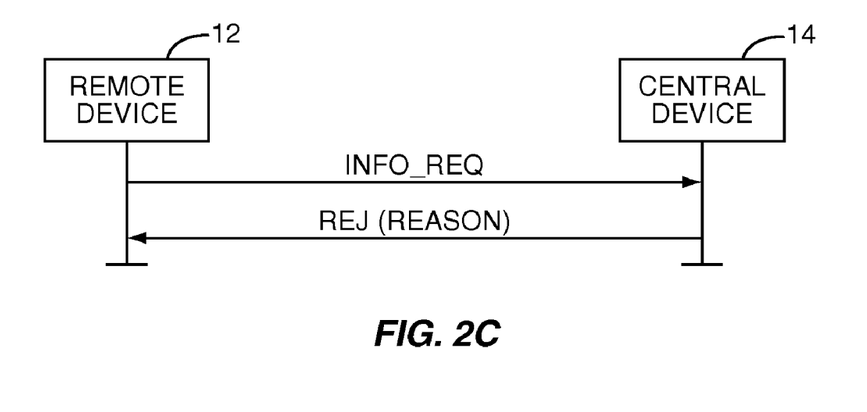

As shown in FIG. 2C, in one embodiment, the central device 14 can reject a request for information from the remote device 12 by sending a REJ tag in response to receiving an INFO_REQ tag from the remote device 12.

Figure 2D:
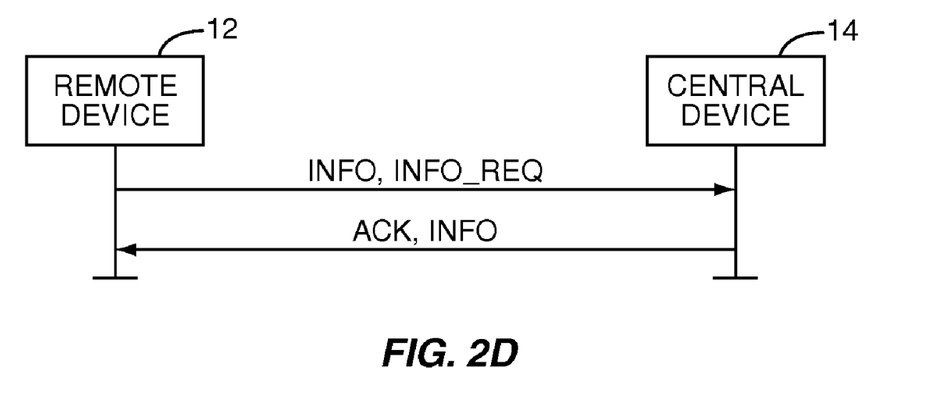

As shown in FIG. 2D, the remote device 12 can simultaneously send information and request information by including both an INFO and INFO_REQ tag in the same payload. In response, the central device 14 sends an ACK tag and an INFO tag in the same payload.

Figure 2E:
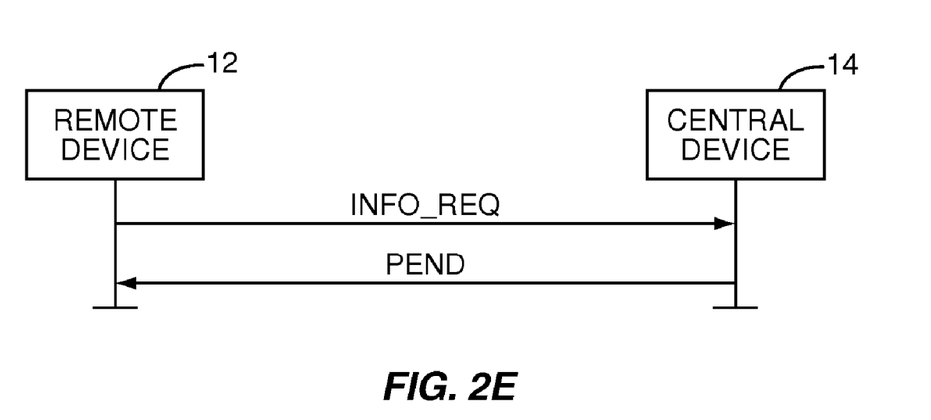

As shown in FIG. 2E, if the central device 14 does not have the requested information immediately available, it can respond to an INFO tag received from the remote device 12 by sending a PEND tag back to the remote device 12 indicating to the remote device 12 that the information should be requested again at a later time.

FIGS. 3A-3D illustrate various exemplary message exchanges according to the present invention. These figures provide a variety of examples of how the present reduced complexity Bluetooth protocol can be used with a variety of applications. The described message exchange sequences are exemplary only, and are not to be construed as limiting the present inventive method and apparatus.

Figure 3A:
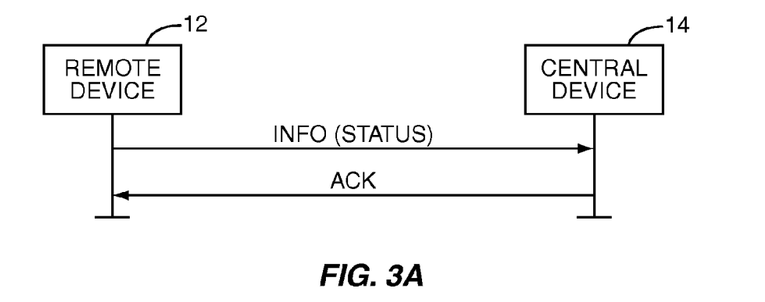
FIGS. 3A-3E illustrate exemplary embodiments of the present invention.

FIG. 3A illustrates a first example where the remote device 12 is incorporated into a security window sensor. The user model of a window sensor is relatively simple and may include periodic information exchange as well as asynchronous information exchange. The periodic information exchange may be a message indicating that the sensor is still active, or operable. For example, an "I'm alive" type of message may be transmitted back to the central device 14, which may be incorporated into a central security panel. This information may be sent by the window sensor once a day or however often this type of information is necessary. The asynchronous information may include status updates on whether a window is open, closed, or has been broken, or whether there is a low battery condition in the sensor.

As stated above, in this scenario, the window sensor is the remote device 12 and the security panel is the central device 14. FIG. 3A illustrates an exemplary message sequence for this application. The remote device 12, or window sensor, may send status information ("status") to the central device 14, or security panel, using an INFO tag and the status information in the payload of a packet communicated to the central device 14. In response to receiving the INFO tag, the central device 14 sends an ACK tag to the remote device 12. The "status" may be, for example, "alive," "open," "closed," "broken," or "low battery."

A similar example is that of a light switch, where the light switch is the remote device 12 and the light is the central device 14. The light switch may only use an asynchronous information exchange. The message sequence may appear the same as the message sequence shown in FIG. 3A for the window sensor with the exception that the status choices may be: "on," "off," and "x percent on" (for a sliding light switch).

Figure 3B:
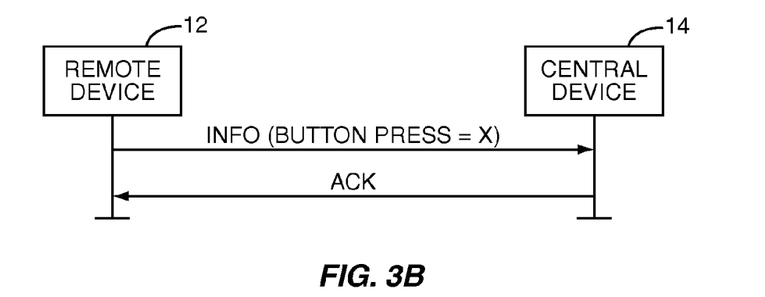
Figure 3C:
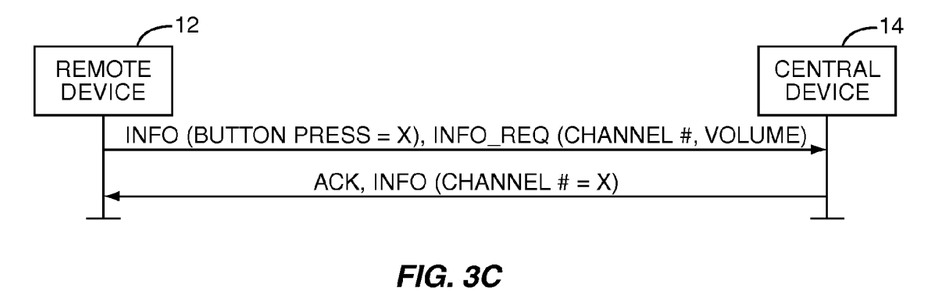

FIGS. 3B and 3C illustrate exemplary message sequences, where the remote device 12 is a remote control unit and the central device 14 is a television or stereo. The remote control unit may have a user interface or it may only have buttons. In the simple case where the remote control unit only has buttons, the information exchange may be uni-directional. If the remote control includes a display, the information exchange may be bi-directional.

As shown in FIG. 3B, for the simple case, the remote control transmits information representative of button presses to the television or stereo. More specifically, the remote device 12, or remote control unit, sends button press information to the central device 14, or television or stereo, using an INFO tag in the payload of a packet. The television or stereo responds using an ACK tag.

FIG. 3C illustrates a more complex case where the remote device 12, or remote control unit, transmits an INFO_REQ tag requesting certain display information, such as current channel number, current volume level, or other status information. As illustrated, the remote device 12 may send the INFO_REG tag requesting the current channel number and volume level from the central device 14. In the same payload, the remote device 12 may send an INFO tag providing button press information to the central device 14. In response, the central device 14 sends an ACK tag acknowledging the receipt of the INFO tag and an INFO tag providing the requested information.

Figure 3D:
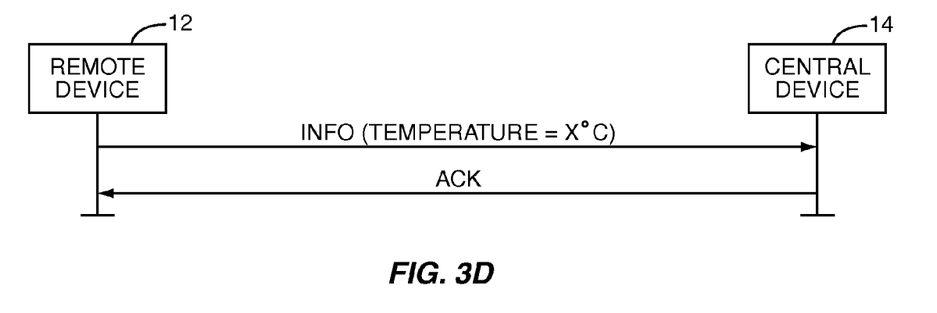

FIG. 3D illustrates yet another exemplary message sequence where the remote device 12 is a temperature sensor. The temperature sensor may periodically transmit temperature information to the central device 14 or transmit the temperature information whenever the temperature changes by more than a predefined value. In either case, the message exchange is similar to that described above with the sensor transmitting the current temperature information.

In this case, the remote device 12 is the temperature sensor and the central device 14 is the destination of the temperature information. The remote device 12 sends temperature information to the central device 14 using an INFO tag, and the central device 14 responds with an ACK tag to acknowledge receipt of the temperature information.

A similar example is that of a tire pressure gauge where the remote device 12 is a tire pressure gauge and the central device 14 is a destination of the tire pressure information, such as a control system of a vehicle. The message exchange would be similar to that of FIG. 3D with the exception that the information transmitted would be tire pressure (PSI) rather than temperature information.

Figure 3E:
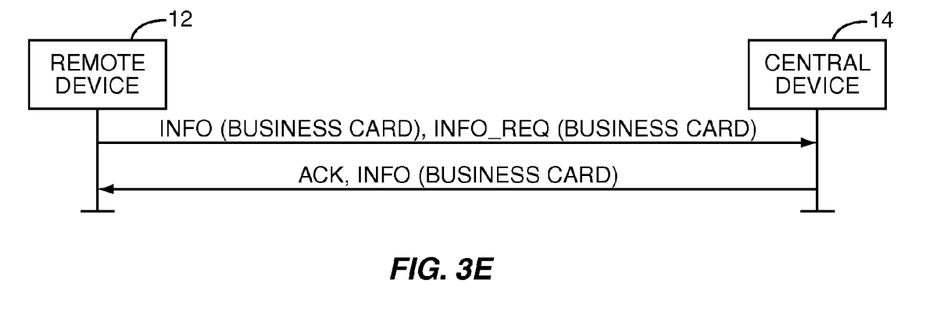

FIG. 3E illustrates another example where the remote device 12 is used to exchange business card information with the central device 14, or destination device. In this example, reduced complexity Bluetooth protocol of the present invention may facilitate either uni-directional or bi-directional business card exchange. As illustrated, the remote device 12 may transmit an INFO tag with its business card information and an INFO_REQ tag requesting business card information from the central device 14. The INFO tag and the INFO_REQ tag may be transmitted in the payloads of separate packets, or, as illustrated, in the payload of the same packet. The central device 14 may respond with an ACK tag acknowledging the receipt of the INFO tag and an INFO tag for its business card information. As with the remote device 12, the central device 14 may communicate the ACK tag and the INFO tag in the payloads of separate packets, or, as illustrated, in the payload of the same packet.

According to one embodiment of the present invention, the reduced complexity Bluetooth protocol is implemented using many of the most basic building blocks of the above-incorporated Bluetooth Specification. These building blocks include "paging," "page scanning," "hopping," packet types, and structure. The details of how these building blocks are adapted for use in the present reduced complexity Bluetooth MAC of remote devices 12, central device 14, and the central-remote device 22 are described below.

Paging is one of the simplest Bluetooth operations. All that is necessary to perform this operation is a radio, minimal baseband functionality, and a limited hopping kernel. In order to page, there is no need for a link manager, HCI or host, although some limited capability of a host is necessary to initiate the paging. The complexity of Bluetooth communications increases when the device enters the connection state and the link manager and higher protocol layers are activated. Therefore, in order to reduce the complexity and cost of a device, it is desirable to be able to transmit information in the paging state.

With the addition of the faster connection feature defined in the incorporated Version 1.2 of the Bluetooth Specification, it is possible for a device to initiate and complete paging within a maximum of 27.5 ms (11.25 ms for the first scan, 11.25 ms for the second scan, and 5 ms for the four FHS/ID attempts) if the scanning device is using interlaced scan with an interval of 36 slots (22.5 ms). If the scanning device is using a 100 ms scanning interval, the maximum time is 100 ms+11.25 ms+5 ms=116.25 ms.

If we assume that the paging device will be used on the order of 10 times per day, the duty cycle of activity is approximately 1 second out of 86,400 seconds or 0.001% resulting in current consumption approximately equal to the leakage current of that device. If, for example, the "park" state were used instead, the duty cycle would be approximately $1/1600$ (0.06%). However, this duty cycle does not include link supervision and the time spent in active mode to communicate information which increases the duty cycle (and power consumption) to levels where the battery life of many applications cannot be attained.

Since this type of device does not require the vast majority of the software required for typical Bluetooth communications, the silicon die area will be much reduced as compared with a standard Bluetooth device. This may be a reduction of 50% or more as compared with a full-featured Bluetooth integrated circuit (IC) (including "sniff" and/or "park"). In addition, the resulting reduced die area will have less leakage current which, as shown above, is the majority of the current in either mode of operation. It is therefore possible for a device using the present method and apparatus to have significantly longer battery life than one utilizing "sniff" or "park" for the identical information transfer.

Thus, according to one embodiment of the present invention, only two baseband functions, paging and page scanning, are used in order for the remote device 12 to send data or to request data from the central device 14.

Figure 4:
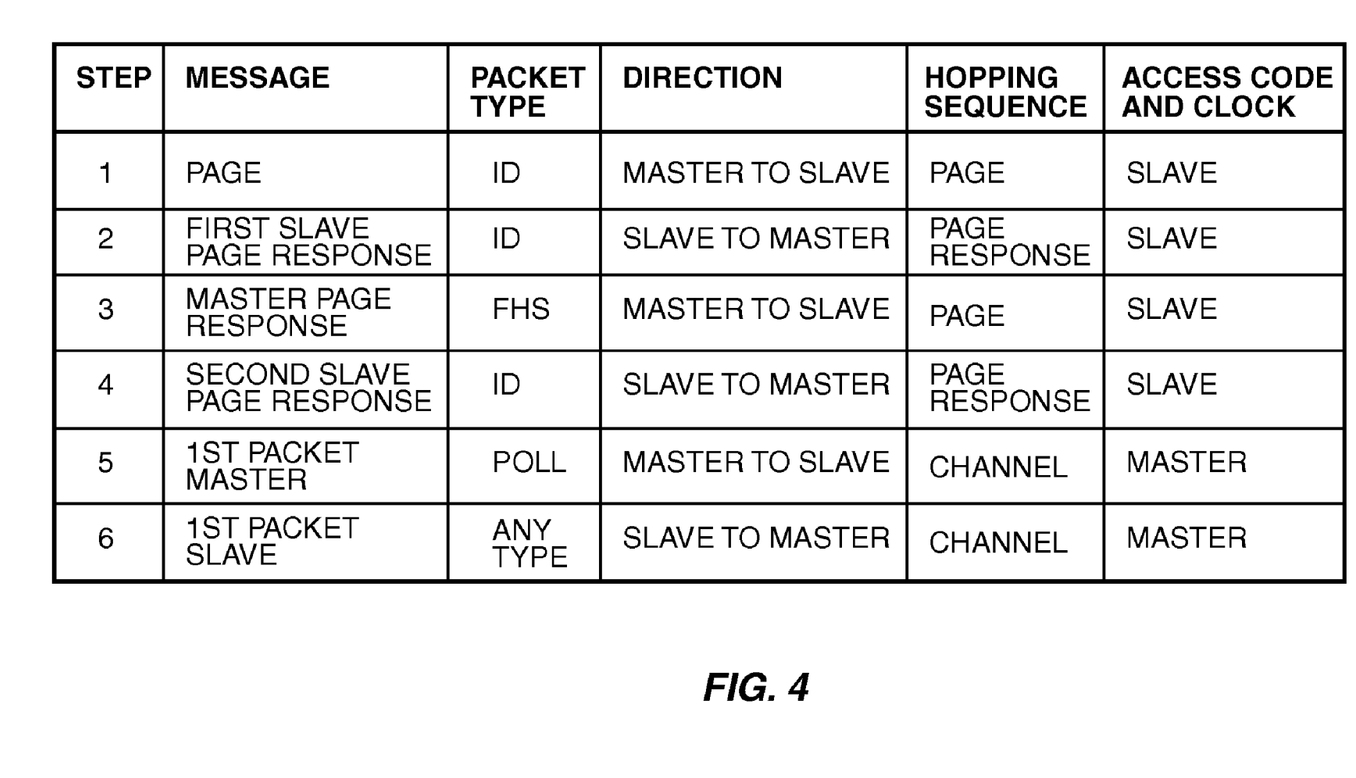
FIG. 4 illustrates the traditional Bluetooth paging scheme according to Version 1.2 of the Bluetooth Specification.

FIG. 4 illustrates a page procedure that is in accordance with Version 1.1 of the Bluetooth Specification (published on Feb. 22, 2001) and the above-incorporated Version 1.2 of the Bluetooth Specification. A page message is first sent by a paging device, also referred to as a master device. The first page message is sent as an ID packet type, which includes only an access code without a packet header or payload (step 1). A slave device responds to the page message with a first slave response message, which is an ID packet (step 2). The master device then sends a master page response message, which is a FHS packet (step 3). The FHS packet structure is designed such that the master device (paging device) transmits enough information for the slave device to be able to enter into the connection state. This information includes device specific information such as the Bluetooth device address (BD_ADDR) of the master device and the class of the master device as well as time-specific information such as the Bluetooth variable CLK.

In response to the master page response, the slave device sends a second slave page response, which is an ID packet (step 4). Once this exchange has completed, the devices enter into the connection state where the master first sends a packet of the POLL packet type (step 5) and the slave responds using any packet type (step 6). Thereafter, the message exchange continues until the connection is terminated.

Figure 5:
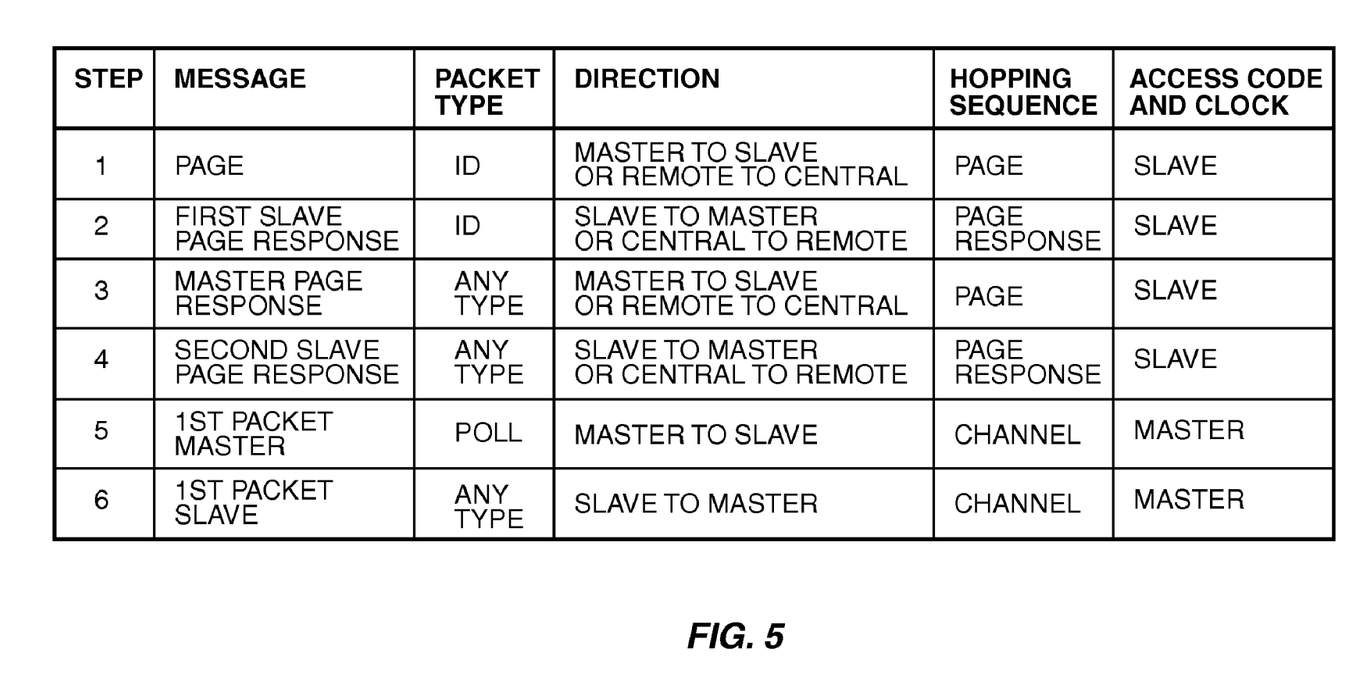
FIG. 5 illustrates a first embodiment of the present invention providing a generic Bluetooth paging scheme accommodating both the traditional Bluetooth paging scheme of FIG. 4 and a reduced complexity Bluetooth protocol for exchanging information between a remote device and a central device during a paging session according to one embodiment of the present invention.

FIG. 5 illustrates a generic paging scheme that accommodates both the Bluetooth paging scheme of FIG. 4 as well as a reduced complexity Bluetooth paging scheme according to one embodiment of the present invention. In one embodiment, two parts of the page response mechanism in the Bluetooth baseband protocol are changed in the reduced complexity Bluetooth MAC: namely, "master page" response packet and the second "slave page" response packet. The fundamental concept of this embodiment of the present invention is to allow a remote device 12, which operates as a master device in the paging scheme, to transmit an ACL packet (DM1, DH1, DM3, DH3, DM5, DH5, AUX1) instead of the FHS packet traditionally required for the master page response packet.

As illustrated, the generic paging scheme begins by a remote device 12, which operates as a master device, sending a page message in the ID packet type. The central device 14, which operates as a slave device, responds to the page message with a first slave response message, which is an ID packet. With the master page response message, the generic paging scheme differs from that in FIG. 4. If the remote device 12 then sends a FHS packet for the master page response message, then the scheme proceeds as discussed above with respect to FIG. 4 to establish a connection.

If the remote device 12 sends a non-FHS packet as the master page response, the reduced complexity Bluetooth protocol is initiated, and the central device 14 does not attempt to enter the connection state (steps 5 and 6). Instead, the central device 14 responds with an ACL packet in the second slave page response message. According to the present invention, the master page response and the second slave page response messages in the generic paging scheme are used for the message exchange between the remote device 12 and the central device 14. More specifically, the master page response is a non-FHS packet, and the payload of the master page response contains one or more of the tags discussed above and the sequence ends at step 4. For example, the master page response may be an ACL packet containing an INFO tag and an INFO_REQ tag in the payload. The central device 14 may then respond with the second slave response message. Instead of being an ID packet, the second slave response may be any non-ID packet. For example, the second slave response may be an ACL packet containing an ACK tag acknowledging receipt of the INFO tag and an INFO tag in response to the INFO_REQ tag from the remote device 12.

In sum, this embodiment of the present invention provides a generic paging scheme that may be used to communicate information for the reduced complexity Bluetooth protocol of the present invention during the paging process. More specifically, the reduced complexity Bluetooth system of the present invention enables communication of information in the master page response and the second slave response messages of the paging scheme.

It should be noted that each time the remote device 12 reaches the end of a paging train (16 timeslots), bits 16 down to 12 of the estimated Bluetooth clock, CLKE16-12, may be randomized. This may be done to prevent certain deadlock conditions.

It is also possible, though not required, to tighten up the receive window aperture requirements on the first slave page response message from ±10 us to ±2 us. Tightening up this requirement will help prevent certain failure cases when multiple remote devices 12 are attempting to connect to the central device 14 at the same time.

One of the potential problems with this type of approach is that the remote device 12 may not definitely know that the central device 14 responded to its page or another page because the normal second slave page response packet is only an ID packet. Because reliable communication is required, a slight modification to the page response sequence may be necessary. Thus, in one embodiment, the remote device 12 transmits its BD_ADDR in the FROM tag in the master page response message. The central device 14 responds with an ACL packet containing the tag containing the FROM tag in the received master page response packet in the second slave page response message. This operation is very simple, from the point of view of firmware, yet gives all of the information necessary for acknowledgement. It is also possible for the receiving device to include other information besides the FROM tag.

In one embodiment of the present invention, an information request from the remote device 12 may be rejected by the central device 14 by sending back the REJ tag. This can be done by the central device 14 for a variety of reasons, including that the BD_ADDR or a short address is invalid or not allowed by the central device 14.

In some cases, sending the entire 48-bit BD_ADDR is inefficient and unnecessary. In these cases, the remote device 12 may transmit a FROM tag with the full BD_ADDR and an INFO_REQ tag requesting a short address from the central device 14 in the master page response message. In this scenario, the central device 14 responds with the BD_ADDR in the FROM tag and the short address in an INFO tag (with an assigned short address) in the second slave page response message. After this exchange, the remote device 12 uses the short address in the FROM tag instead of the BD_ADDR in the FROM tag at the beginning of the payload of each master page response message.

Short addresses may have a timeout associated with them on both the remote device 12 and the central device 14. In one embodiment, this timeout may be specified by a host. Once the timeout expires, the remote device 12 uses the BD_ADDR in the FROM tag.

The remote device 12 may use the FROM tag to "poll" information from the central device 14. In this scenario, the remote device 12 sends a FROM tag and an INFO_REQ tag requesting information in the master page response message. The central device 14 then responds with the FROM tag and a tag containing the requested information in the second slave page response message.

In one embodiment, the reduced complexity Bluetooth MAC makes use of standard Bluetooth ACL packet types (DM1, DH1, . . . DH5). The central device 14 supports all ACL packet types, but the remote device 12 only needs to support the packet types that it requires. It is not important for the central device 14 to know what packet types the remote device 12 supports because the remote device 12 does not request any information that would require a packet type larger than the packet type that the remote device 12 supports.

Figure 6:
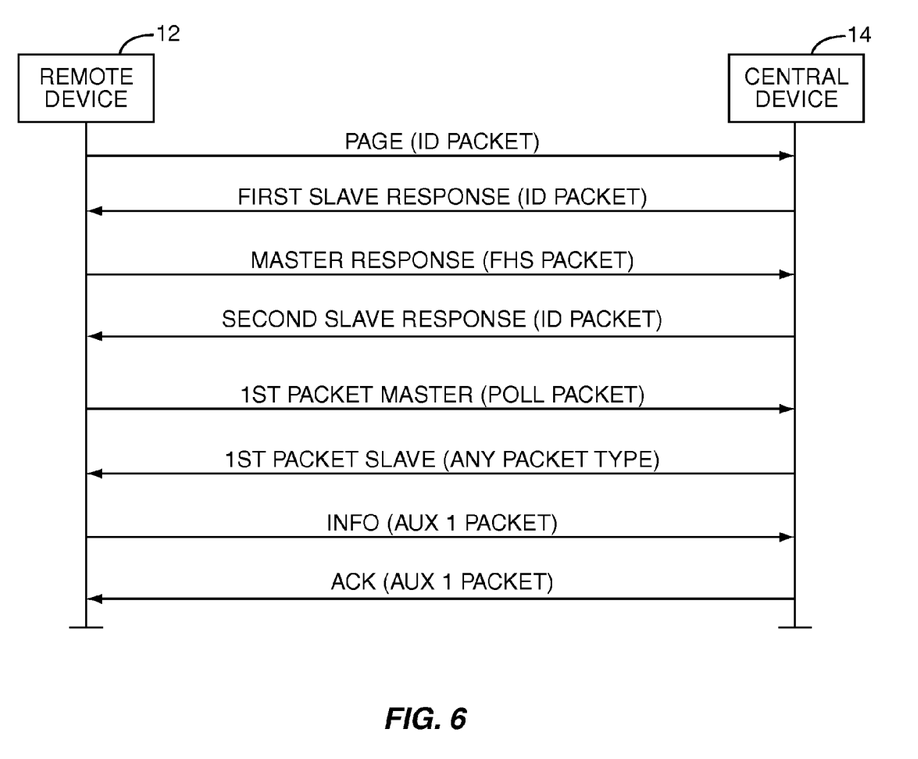
FIG. 6 illustrates a second embodiment of the present invention where a connection between a remote device and a central device is established using the traditional paging scheme of FIG. 4 and thereafter information is exchanged between the remote device and the central device using tagged data within a payload of AUX1 packets.

FIG. 6 illustrates a messaging scheme for reduced complexity Bluetooth communication according to a second embodiment of the present invention. In this embodiment, the traditional paging scheme of FIG. 4 is used to establish a connection between the remote device 12 (paging device) and the central device 14. However, after the connection is established, the traditional Bluetooth protocol requires a master Bluetooth device to initiate Link Manager Protocol. This is not done in the reduced complexity Bluetooth system of the present invention. The remote device 12 in the reduced complexity Bluetooth system of the present invention does not have to deal with multiple devices in a piconet, which requires higher protocols such as LMP. Instead, a new set of messaging is initiated after connection using specially formatted messages sent using AUX1 packets. The Bluetooth protocol reserves the AUX1 packet for proprietary uses. Accordingly, once the connection is established, the remote device 12 initiates a message exchange with the central device 14 using the tags described above.

More specifically, FIG. 6 illustrates an exemplary message exchange according to this embodiment of the present invention. As illustrated, the remote device 12 first sends a page message to the central device 14. The central device 14 responds with a first slave response message. The remote device 12 then sends a master response message using the FHS packet type, and the central device 14 responds with a second slave response. Thereafter, the connection is established. To be compliant with the Bluetooth specification, the remote device 12 then sends a first packet master message, which is the POLL packet type, and the central device 14 responds with a first packet slave, which may be any packet type such as the NULL packet type.

Once the connection is established, the remote device 12 may initiate a message exchange according to the present invention. In the exemplary exchange illustrated, the remote device 12 sends an INFO tag in the payload of an AUX1 packet. In response, the central device 14 sends an ACK tag in the payload of an AUX1 packet. It should again be noted that the INFO and ACK exchange of FIG. 6 is exemplary. Any of the tags discussed above may be used such that the remote device 12 may send information to or request information from the central device 14. In addition, the concatenation techniques described above may be used to exchange amounts of information larger than the amount that can be carried by the AUX1 packet.

In the embodiment of FIG. 6, the reduced complexity Bluetooth protocol uses the standard RF part of the Bluetooth Specification for single slot packets. In this embodiment, multi-slot packets are not used. Also, in this embodiment, the reduced complexity Bluetooth MAC uses the standard Bluetooth packet format (e.g., access code, packet header, and payload). The payload of reduced complexity Bluetooth packets uses the tagged data format described above. This embodiment of the reduced complexity Bluetooth protocol comprises a completely skew protocol from the standard Bluetooth protocols. Therefore, it is possible to simultaneously operate the reduced complexity Bluetooth protocols with normal Bluetooth operation. In many cases, this will not be required. However, it does permit additional flexibility. For example, it allows a Bluetooth compatible device to support reduced complexity Bluetooth at very little additional cost.

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order, except for those embodiments described in a claim that include a specified order for the steps.

Those skilled in the art will recognize improvements and modifications to the preferred embodiments of the present invention. All such improvements and modifications are considered within the scope of the concepts disclosed herein and the claims that follow.

What is claimed is:

1. A method for a remote device to communicate with a central device comprising:
   establishing a connection with the central device according to the Bluetooth paging scheme;
   sending a first Auxiliary (AUX1) packet to the central device, wherein a payload of the first AUX1 packet comprises first tagged data either providing information to the central device or requesting information from the central device; and
   receiving a second AUX1 packet from the central device, wherein a payload of the second AUX1 packet comprises second tagged data either acknowledging receipt of information from the first AUX1 packet or providing requested information in response to the first AUX1 packet.

2. The method of claim 1 wherein establishing the connection comprises:
   sending a paging message as an Identity (ID) packet to the central device;
   receiving a first slave response as an ID packet from the central device;
   sending a master page response to the central device as a Frequency Hop Synchronization (FHS) packet;
   receiving a second slave response from the central device as an ID packet;
   sending a first master packet to the central device as a Bluetooth POLL packet; and
   receiving a first slave packet from the central device as a Bluetooth NULL packet;

and the sending the first AUX1 packet is done prior to initiating a Link Manager Protocol.

3. The method of claim 1 wherein sending the first AUX1 packet comprises providing the first tagged data in the payload of the first AUX1 packet wherein the first tagged data comprises at least one tag selected from the group consisting of an information tag indicating that the payload comprises information from the remote device to be provided to the central device and an information request tag requesting information from the central device.

4. The method of claim 3 wherein receiving the second AUX1 packet comprises receiving the second tagged data in the payload of the second AUX1 packet, wherein the second tagged data comprises at least one tag selected from the group consisting of an information tag indicating the that payload comprises requested information from the central device and an acknowledgement tag indicating receipt of information from the remote device.

5. The method of claim 4 wherein sending the first AUX1 packet further comprises providing a FROM tag indicating an address of the remote device in the first tagged data in the payload of the first AUX1 packet, and receiving the second AUX1 packet further comprises receiving the FROM tag indicating the address of the remote device in the second tagged data in the payload of the second AUX1 packet.

6. The method of claim 5 wherein the address of the remote device is a Bluetooth address of the remote device.

7. The method of claim 5 wherein the address of the remote device is a short address of the remote device.

8. An apparatus for communicating with a central device comprising:
means for establishing a connection with the central device according to the Bluetooth paging scheme;
means for sending a first Auxiliary (AUX1) packet to the central device, wherein a payload of the first AUX1 packet comprises first tagged data either providing information to the central device or requesting information from the central device; and
means for receiving a second AUX1 packet from the central device, wherein a payload of the second AUX1 packet comprises second tagged data either acknowledging receipt of information from the first AUX1 packet or providing requested information in response to the first AUX1 packet.

9. A computer program product for communicating with a central device comprising:
non-transitory tangible media comprising:
code for causing a computer to establish a connection with the central device according to the Bluetooth paging scheme;
code for causing a computer to send a first Auxiliary (AUX1) packet to the central device, wherein a payload of the first AUX1 packet comprises first tagged data either providing information to the central device or requesting information from the central device; and
code for causing a computer to receive a second AUX1 packet from the central device, wherein a payload of the second AUX1 packet comprises second tagged data either acknowledging receipt of information from the first AUX1 packet or providing requested information in response to the first AUX1 packet.

10. A method for communicating with a remote device comprising:
establishing a connection with the remote device according to the Bluetooth paging scheme;
receiving a first Auxiliary (AUX1) packet, wherein a payload of the first AUX1 packet comprises first tagged data either providing information or requesting information; and
sending a second AUX1 packet, wherein a payload of the second AUX1 packet comprises second tagged data either acknowledging receipt of information from the first AUX1 packet or providing requested information in response to the first AUX1 packet.

11. The method of claim 10, the establishing a connection comprising:
receiving a paging message as an Identity (ID) packet from the remote device;
sending a first slave response as an ID packet from the central device;
receiving a master page response from the remote device as a Frequency Hop Synchronization (FHS) packet;
sending a second slave response from the central device as an ID packet;
receiving a first master packet from the remote device as a Bluetooth POLL packet; and
sending a first slave packet from the central device as a Bluetooth NULL packet; and the receiving the first AUX1 packet is done prior to a Link Manager Protocol being initiated.

12. The method of claim 10 wherein receiving the first AUX1 packet comprises receiving the first tagged data in the payload of the first AUX1 packet wherein the first tagged data comprises at least one tag selected from the group consisting of an information tag indicating that the payload comprises information from the remote device to be provided to the central device and an information request tag requesting information from the central device.

13. The method of claim 10 wherein sending the second AUX1 packet comprises providing the second tagged data in the payload of the second AUX1 packet, wherein the second tagged data comprises at least one tag selected from the group consisting of an information tag indicating the that payload comprises requested information from the central device and an acknowledgement tag indicating receipt of information from the remote device.

14. The method of claim 13 wherein receiving the first AUX1 packet further comprises receiving a FROM tag indicating an address of the remote device in the first tagged data in the payload of the first AUX1 packet, and sending the second AUX1 packet further comprises providing the FROM tag indicating the address of the remote device in the second tagged data in the payload of the second AUX1 packet.

15. The method of claim 14 wherein the address of the remote device is a Bluetooth address of the remote device.

16. The method of claim 14 wherein the address of the remote device is a short address of the remote device.

17. An apparatus for communicating with a remote device comprising:
means for establishing a connection with the remote device according to the Bluetooth paging scheme;
means for receiving a first Auxiliary (AUX1) packet, wherein a payload of the first AUX1 packet comprises first tagged data either providing information or requesting information; and
means for sending a second AUX1 packet, wherein a payload of the second AUX1 packet comprises second tagged data either acknowledging receipt of information from the first AUX1 packet or providing requested information in response to the first AUX1 packet.

18. A computer program product for communicating with a remote device, the product comprising:

non-transitory tangible media comprising: code for causing a computer to establish a connection with the remote device according to the Bluetooth paging scheme;

code for causing a computer to receive a first Auxiliary (AUX1) packet, wherein a payload of the first AUX1 packet comprises first tagged data either providing information or requesting information; and code for causing a computer to send a second AUX1 packet, wherein a payload of the second AUX1 packet comprises second tagged data either acknowledging receipt of information from the first AUX1 packet or providing requested information in response to the first AUX1 packet.

* * * * *